Sept. 21, 1965 A. W. MASSMAN 3,207,844
NOISE CANCELLATION FOR THE AGC OR SYNC SEPARATOR STAGES IN A TELEVISION RECEIVER
Filed Feb. 4, 1963
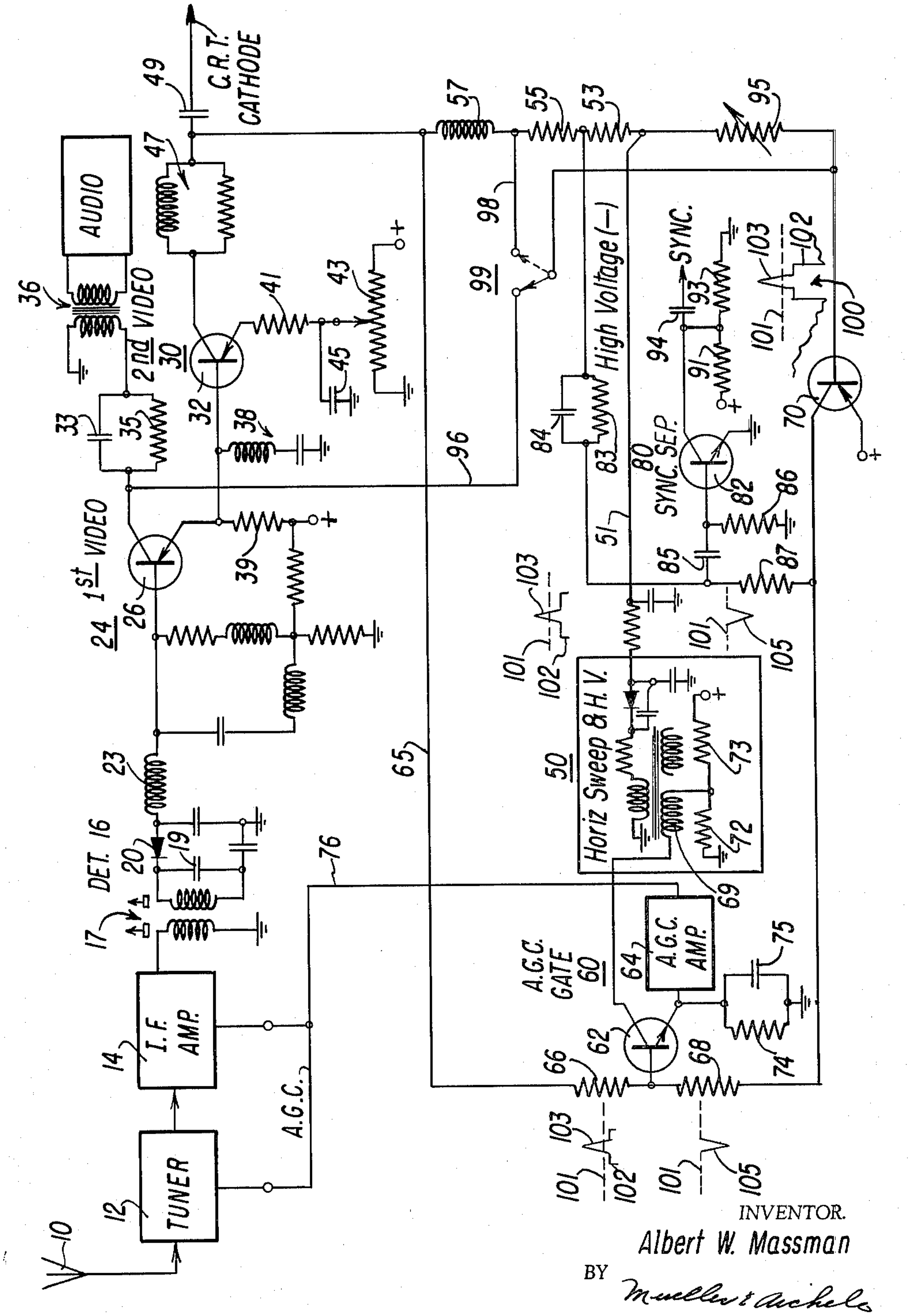
INVENTOR.
Albert W. Massman
BY Mueller & Aichele
Attys.

3,207,844
Patented Sept. 21, 1965

3,207,844

NOISE CANCELLATION FOR THE AGC OR SYNC SEPARATOR STAGES IN A TELEVISION RECEIVER

Albert W. Massman, Wheaton, Ill., assignor to Motorola, Inc., Chicago, Ill., a corporation of Illinois Filed Feb. 4, 1963, Ser. No. 255,995
7 Claims. (Cl. 178—7.3)

The present invention relates generally to transistorized television receivers and in particular to improved circuit means for making the synchronizing signal separator and the automatic gain control circuits of the receiver immune to impulse noise which may accompany the received television signal.

In present day television receivers the received signal is a composite of video information signals and periodically occurring synchronizing signals. The carrier is modulate by the video information signal between minimum and maximum limits and synchronizing pulses are provided with an amplitude exceeding the maximum video modulation limit. The synchronizing pulses are removed from the detected composite video signal by a synchronizing separator circuit and coupled to the appropriate horizontal and vertical sweep circuits of the receiver.

It is further desirable to provide an automatic gain control signal which is independent of video signal information level to avoid variation in average picture current (and thus a fluctuation in picture brightness) and to exclude random noise impulses occurring during periods of reception of video information signals from the automatic gain control (AGC) system of the receiver. Thus, it is also conventional practice to derive the AGC signal for the receiver from the amplitude level of the synchronizing pulses. To this end, the AGC circuit is gated by a pulse obtained from the horizontal sweep circuit so that the composite video signal is sampled by the AGC system only at such times as synchronization pulses are present.

There still remains, however, the possibility that noise bursts present concurrent with the occurrence of synchronizing pulses will supply noise impulses containing sufficient energy to paralyze the synchronizing separator circuit and to produce "set-up" in the AGC system. In a transistorized receiver the synchronizing signal separator is essentially an amplitude limiting transistor with a time constant network coupling the composite video signal to the input electrode thereof so that an output pulse is produced when the input exceeds the maximum modulation limit of the video information signal, as occurs when synchronizing signals are present. The time constant network retains a charge to reverse bias the transistor to prevent an output when video information signals are present. High energy noise impulses may charge this input network to a level in excess of that provided by synchronizing signals and the time constant of the circuit will maintain the synchronizing signal separator disabled for a period covering the reception of one or more subsequent synchronizing signals, resulting in loss of synchronization. And since it is desirable to provide the AGC network of the receiver with a relatively long time constant to produce delay and to prevent rapid fluctuations of the AGC control voltage, the energy contained in impulse noise accompanying the synchronizing signal may result in excessive gain reduction for undesirable periods of time.

Although it is known in television receivers utilizing vacuum tube circuits to compensate for such impulse noise either by disabling the synchronizing signal separator circuit and the AGC system during the reception of individual synchronizing pulses which may contain noise impulses or by cancelling the noise therefrom, the voltage levels and polarities associated with vacuum tubes, as well as their high impedance characteristics, have presented difficulties in the past which have made their operation less than satisfactory. As a result the circuit techniques used to overcome these difficulties have not been compatible with efficient use of transistors. The impedance levels at which the transistors are advantageously operated, as well as other differing characteristics require new circuit configurations and modes of operation which are not the same as existing vacuum tube circuits.

It is therefore among the objects of the present invention to provide a transistorized television receiver incorporating improved circuitry to make the synchronizing signal separator and the AGC system of the receiver immune to the deleterious effects of high energy impulse noise which may accompany the reception of synchronizing signals.

Another object is to provide an improved noise inverter circuit for use in a transistorized television receiver, which circuit effectively cancels high level noise impulses accompanying the synchronizing signal portion of the detected composite video signal so that the synchronizing signal separator circuit is not paralyzed and the AGC system is not "set-up" by such noise.

Still another object is to provide a simple and inexpensive transistor noise cancelling circuit which may be incorporated with the synchronizing signal separator and the AGC gate of a TV receiver to prevent such circuits from suffering the adverse effects of noise disturbances occurring with the received television signal.

A feature of the present invention is the provision of a noise cancelling transistor having an output electrode coupled to the input electrodes of the synchronizing signal separator and the automatic gain control gate of a television receiver, and of means for coupling a signal representative of the detected composite video signal to the input electrode of the noise cancelling transistor. The noise cancelling transistor is normally biased to saturation and remains so for signals applied to its input electrode which do not exceed the maximum amplitude level of received synchronizing signals. Noise impulses rising to a predetermined level above the maximum level of the synchronizing signals of the composite video signal causes rapid cutoff of the transistor and an inverted impulse is produced which eliminates the noise impulse appearing at the inputs of the synchronizing signal separator and the AGC gate.

Another feature of the invention is the provision of a noise cancelling transistor which derives an input from the detected composite video signal of a television receiver and which produces an instantaneous change in the D.C. level of its output in the presence of noise disturbances exceeding the maximum amplitude of the synchronizing component of the detected composite video. This instantaneous level change is reflected to the input of the synchronizing signal separator circuit and the AGC gating circuit to make such circuits immune to adverse effects of noise disturbances exceeding a selected level.

A further feature of the invention is the provision of a noise cancellation circuit of the type described in which the noise cancelling transistor experiences an increased input impedance as it is driven out of saturation by impulse noise so that regeneration takes place for instantaneous output level change.

Other objects, features and attending advantages of the invention will become apparent from the following description when taken in conjunction with the accompanying drawing, which is a circuit partly in block and partly in schematic form of a television receiver incorporating an embodiment of the invention.

In practicing the invention there is provided a transistorized television receiver which includes a synchronizing signal separator transistor and an AGC gating transistor, each having an input circuit which is direct coupled through video amplifier stages to the video detector of the receiver. The synchronizing signal separator transistor includes a self-biasing input circuit for applying a composite video signal thereto, which biasing circuit has a series coupling capacitor, a base return resistor, and a RC differentiating network, and accordingly is biased by the synchronizing signal so that it conducts to provide an output only in the presence of the synchronizing signal, which signal exceeds the maximum modulation level of the video information signal. The series coupling capacitor retains a charge and current through the base return resistor maintains a reverse bias to cutoff the transistor between synchronizing pulses. The AGC gating transistor receives a keying or gating pulse to render it conductive by the horizontal sweep circuit, which in turn is synchronized with the synchronizing signal component of the composite video signal, so that an AGC signal is provided which is proportional to the level of the synchronizing signal.

A noise cancelling or inverting transistor having its output electrode resistively coupled to the input circuits of both the synchronizing signal separator transistor and the noise gating transistor is biased well into saturation from a high impedance source connected to its input electrode, which input electrode is further direct current coupled to the output of a video amplifier stage in the receiver. The noise cancelling transistor remains saturated during the application of composite video signals to its input electrode which are unaccompanied by impulse noise disturbances. However, noise disturbances which exceed a predetermined level, normally a few tenths of a volt above the maximum level of the synchronizing signal, drives the transistor to cutoff and an inverted impulse signal appears at its output electrode to cancel the noise impulses which concurrently occur at the input circuits of the synchronizing signal separator and the noise gating transistors.

Referring now to a particularized circuit embodiment as shown in the drawing, television signals received at antenna 10 are fed to the input of tuner 12, which is a conventional television tuner and may include a plurality of RF amplification stages as well as the local oscillator and mixer or first detector. Signals appearing at the output of tuner 12 are coupled to the input of intermediate frequency amplifier 14, which has a number of stages cascaded in the manner well understood in the art. Typically IF amplifier 14 may include three stages, with the first two stages broadly tuned and with AGC applied thereto and with the third stage very sharply tuned for maximum selectivity and stability.

The output of IF amplifier 14 is coupled to the second or video detector stage 16 by coupling transformer 17. The secondary winding of transformer 17 is tuned by capacitor 19 to a selected intermediate frequency, with one end of the tuned circuit connected to the anode electrode of detector diode 20. The output of detector diode 20, poled to provide a negative going composite video signal, is direct current coupled through choke coil 23 to the input base electrode of transistor 26 of first video amplification stage 24. This output further includes the sound subcarrier which is also amplified by transistor 26 and derived at the collector electrode thereof and supplied by a filter including capacitor 33 in parallel with resistor 35 to transformer 36 for coupling to the audio system of the receiver. A series resonant circuit 38, coupling the emitter electrode of transistor 26 to ground, is tuned to provide a bypass for the sound subcarrier and a high impedance for video signals. Emitter bias is provided for transistor 26 from a positive source through resistor 39 and a composite video signal developed thereacross is direct current coupled to the input base electrode of transistor 32 of second video amplification stage 30.

The emitter circuit of transistor 32 includes a biasing arrangement comprised of resistors 41 and 43 and capacitor 45. Resistor 43 is variable with one end connected to a positive potential source and the other end at ground potential. The tap point of resistor 43 is connected to series emitter resistor 41 and may be adjusted to change the emitter bias of transistor 32 and thus the level of video signals to function as a contrast control. Capacitor 45 provides a bypass for resistor 43 at video frequencies to prevent undue degeneration by resistor 43. Fixed resistor 41, of a relatively low value, is unbypassed to allow some fixed degeneration for stable operation of the transistor 32 as a video frequency amplifier.

Amplified video signals appearing at the collector electrode of transistor 32 are coupled to peaking network 47 and blocking capacitor 49 to the cathode of a cathode ray picture tube. Since a transistor receiver of the type described may operate from a battery source which provides a potential in the order of 20 volts, it is desirable to provide a higher collector potential for transistor 32 in order to produce sufficient drive for the cathode ray tube. To this end, the high voltage appearing at the secondary of the horizontal output transformer of the horizontal sweep and high voltage circuit 50 is rectified, filtered, and supplied on lead 51 to be connected through resistors 53 and 55, peaking coil 57, and network 47 to the collector electrode of transistor 32. Typically the voltage appearing on lead 51 is in the order of 130 volts and for the PNP video amplifier transistors shown is negative with respect to ground reference potential. When a positive emitter bias in the order of 10–20 volts is provided for transistor 32, video stage 30 produces a voltage swing in excess of 130 volts for cathode ray tube drive. With the polarity of detector diode 20 as shown, and with video stage 24 essentially an emitter follower at video frequencies, a positive going composite video signal is provided at the collector electrode of transistor 32.

The AGC system 60 of the receiver includes gating transistor 62 and AGC amplifier 64. The composite video signal appearing at the junction point of capacitor 49 and peaking coil 57 is coupled by lead 65 and resistor 66 to the input base electrode of transistor 62. The base electrode of transistor 62 is further connected through resistor 68 and the collector-to-emitter junction of noise inverting transistor 70 to a positive potential. Accordingly, a voltage divider is provided by resistors 66 and 68 between the positive potential connected to the emitter of transistor 70 and the negative D.C. potential appearing at the collector electrode of video amplifier transistor 32.

The collector electrode of transistor 62 is connected through winding 69 on the horizontal output transformer and resistor 73 to a positive potential source. Resistor 72 provides a voltage divider with resistor 73 so that in conjunction with the voltage appearing at the base electrode of transistor 62 it is normally biased to cutoff. Since at high video signal levels the signal appearing at the base electrode of transistor 62 may swing positive to a value approaching the positive emitter bias of the video stages, a fixed positive collector bias is desirable to avoid conduction of the base-to-collector diode of transistor 62. Voltage pulses appearing at the horizontal sweep rate in the horizontal output transformer are coupled by winding 69 to the collector electrode of transistor 62 to drive it into conduction. Thus, transistor 62 is conductive during periods of horizontal sweep and is maintained cutoff at such times as the video information signal appears in the composite video signal. Upon conduction current through emitter resistor 74 charges capacitor 75 to a value proportional to the amplitude of synchronization signals applied to the base electrode of transistor 62. This level is in turn directly proportional to the level of received signal to provide an AGC action. The time constant of resistor 74 and capacitor 75 maintains an average level for the AGC signal appearing at this point, which is a sawtooth wave due to the time gating of transistor 62 at horizontal sweep rate. The AGC signal so developed is filtered and amplified by AGC amplifier 64 to be distributed on AGC lead 76 to selected stages in intermediate frequency amplifier 14 and to the RF stages of tuner 12. In a transistor receiver forward AGC is preferable, that is, an AGC signal which increases forward bias to the base electrodes of the transistors involved to drive them into a saturated region in the presence of high level incoming signals.

Composite video signals appearing at the junction point of resistors 53 and 55 are further supplied to the input base electrode of transistor 82 of synchronizing signal separator stage 80 through a self-biasing input network including resistor 83 in parallel with capacitor 84, series capacitor 85, and resistor 86 returning the base electrode of transistor 82 to ground reference potential. The parallel combination of resistor 83 and capacitor 84 tends to differentiate relatively long time constant noise pulses to decrease their effect upon synchronizing separator circuit 82. The time constant of series coupling capacitor 85 and base return resistor 86 is such that the charge stored by capacitor 85 when synchronizing pulses are received is sufficient to reverse bias transistor 82 to cutoff during the video information portion of the composite video signal. Thus, transistor 82 is driven into conduction only by signals which equal or exceed the maximum level of synchronization pulses and remains cutoff during the remaining portion of the composite video signal. The junction between capacitor 85 and the parallel network of resistor 83 and capacitor 84 is connected by resistor 87 to the collector electrode of transistor 70 so that a D.C. level is established at that point as the result of a voltage division between the negative potential on lead 51 and the positive potential supplied to the emitter electrode of transistor 70. The output collector electrode of transistor 82 develops pulses at the junction point of a voltage divider including resistors 91 and 93 and are coupled through capacitor 94 to provide synchronization for the horizontal and vertical sweep circuits of the receiver in the known manner.

From the above it is apparent that in normal operation transistor 62 is gated into conduction concurrent with horizontal sweep to allow capacitor 75 to be charged to a value proportional to the amplitude of synchronizing pulses to establish the AGC level of the receiver. Positive going noise impulses which exceed the level of the synchronizing pulses provide additional charge for capacitor 75, resulting in an increased level of an AGC signal. Because of the time constant of the AGC circuit it thus becomes "set" by impulse noise to over-correct the receiver gain. In a similar manner impulse noise exceeding the maximum level of synchronization pulses appearing at the input of synchronizing separator stage 80 tends to charge capacitor 85 to a level greatly in excess of that provided by synchronizing pulses alone. At the end of the synchronization pulse this charge, in conjunction with resistor 86, may develop a reverse bias sufficient to retain transistor 82 cutoff as subsequent synchronization pulses are received, with a resultant loss of synchronization of the receiver.

To eliminate the above deleterious effects caused by impulse noise, the base electrode of transistor 70 is connected through resistor 95 to the negative potential appearing on lead 51. As previously mentioned, the collector electrode of transistor 70 is connected to the base electrode of transistor 62 by resistor 68 and to the junction point of resistor 83 and capacitor 85 of the input self-biasing network for synchronizing signal separator stage 80 by resistor 87. A positive voltage sufficient to maintain transistor 70 in saturated conduction for a given minimum level of negative signals applied to its base electrode is connected to its emitter electrode. Thus, for the PNP transistor shown for transistor 70 a positive going signal exceeding a given level applied to its base electrode will cut it off. Such a signal may be obtained by direct connection of base electrode of transistor 70 to either the collector electrode of transistor 26 by lead 96 or to the junction point of coil 57 and resistor 55 in the collector output circuit of transistor 32 by lead 98. These alternate connections for deriving the positive going pulse for the base electrode of transistor 70 from leads 96 and 98 are shown generally at reference numeral 99. The noise is less compressed in the output of first video stage 24 and accordingly the connection to the collector electrode of transistor 26 is preferable. Since transistor 70 draws base-to-emitter current when in saturated conduction, a voltage drop appears across resistor 95, and accordingly by making this resistor variable the level of the positive going pulse applied to the base electrode of transistor 70 at which it will be driven out of saturation and into cutoff for a given positive emitter voltage may be readily set. Preferably this level is set to exceed the maximum excursion of the synchronization pulses by a few millivolts so that transistor 70 remains in saturation during the entire excursion of the synchronizing pulse but is driven to cutoff for noise impulses which exceed synchronization pulse by this predetermined small amount. At such times that transistor 70 is cutoff by impulse noise the voltage division provided by resistors 68 and 87 ceases instantaneously and the base electrode of transistor 62 as well as the input to capacitor 85 in the self-biasing network of synchronizing signal separator circuit 80, are instantaneously supplied with a negative going pulse which tends to rise to the level established by the direct connection of these points to the negative potential appearing on lead 51. Thus an inverted noise pulse is reflected through resistors 68 and 87 which is substantially equal in magnitude but opposite in polarity to noise pulses which exceed the maximum excursion of the synchronization pulses by a predetermined amount, and accordingly impulse noise is effectively cancelled from the inputs of AGC circuit 60 and synchronizing signal separator circuit 80 so that noise charge up of capacitors 75 and 85 is prevented.

With reference to the waveforms shown in the drawing, it can be seen that the positive going composite video signal 100 supplied to the base electrode of transistor 70 normally will not exceed level 101, required for cutoff of transistor 70. As previously mentioned, this level exceeds the maximum excursion of synchronization pulses 102 by a few millivolts so that under normal operation transistor 70 remains in saturation to provide the proper voltage division action by resistors 68 and 87 to maintain an established D.C. level at the inputs to AGC circuit 60 and synchronizing signal separator circuit 80. Impulse noise not exceeding level 101 does not contain sufficient energy to charge capacitors 75 and 85 to a degree which will have an adverse effect on AGC circuit 60 or the synchronizing separator circuit 80. Noise impulses 103 exceeding level 101 are inverted as transistor 70 is cutoff to provide negative going noise peaks 105 which are coupled to the base electrode of transistor 62 and to capacitor 85 through resistors 68 and 87, respectively. Because of the direct coupling of each of these two points to be negative collector supply of the video stages appearing on lead 51, inverted noise pulses 105 extend from the same reference level as that at which transistor 70 is cutoff to provide noise cancelling impulses which are equal in magnitude and opposite in polarity to positive noise impulses 103. In addition, the base-to-emitter impedance of transistor 70 increases as such transistor is driven out of saturation to provide a regenerative action to provide instantaneous switching action between saturated conduction and cutoff so that noise cancellation takes place before positive going impulse noise has a chance to supply any substantial charge to capacitors 75 and 85.

The invention provides therefore improved transistorized circuit means for cancelling impulse noise from the inputs to the AGC gating circuit and the synchronizing signal separator circuit of TV receivers. The noise cancelling circuit of the invention utilizes a minimum of components, is particularly adapted for use with transistorized TV receivers and operates to overcome the deleterious effects produced by the charging of capacitors in the AGC gating and synchronizing signal separator circuits by high level impulse noise.

While a particular embodiment of the invention has been shown and described, modifications may be made and it is intended in the appended claims to cover all such modifications as fall within the true spirit and scope of the invention.

I claim:

1. In a receiver for television signals including a video signal component and a synchronizing signal component of an amplitude exceeding the peak amplitude of the video signal component, which video signal component may include noise impulses of an amplitude exceeding the maximum amplitude of the synchronizing pulses contained therein, the combination including: means including a video detector for demodulating television signals and providing a composite video signal, which composite video signal includes synchronizing pulses of a given polarity and which pulses may be accompanied by noise impulses of the same polarity; signal translating means for applying said composite video signal to utilization means; synchronizing signal separator circuit means including a first transistor having input and output electrodes; time constant network means including series capacitance means coupling said input electrode of said first transistor to said signal translating means to supply said composite video signal thereto, with said time constant network means biasing said first transistor to permit conduction thereof only by signals exceeding the maximum amplitude of the video component of said composite video signal, and with said time constant network means retaining a charge to reverse bias said first transistor nonconducting for portions of the composite video signal not exceeding said maximum level of the video component of said composite video signal; a second transistor having input, output and common electrodes; means including a potential supply connected to said common electrode for biasing said second transistor into saturated conduction; resistance means coupling the output electrode of said second transistor to the series capacitance means of said time constant network means; and circuit means coupling the input electrode of said second transistor to said signal translating means to supply said composite video signal thereto, with noise impulses of said given polarity exceeding the maximum level of said synchronizing pulses by a predetermined amount causing said second transistor to become non-conducting, whereby noise cancelling impulses are coupled to said capacitance means of said time constant network means with a reverse polarity to prevent noise charge-up thereof.

2. In a receiver for television signals including a video signal component and a synchronizing signal component of an amplitude exceeding the peak amplitude of the video signal component, and which may include noise bursts of an amplitude exceeding the peak amplitude of the synchronizing signal components, the combination including: means including a video detector for demodulating the television signal and providing a composite video signal, which composite video signal includes synchronizing signal components of a given polarity and which may includes noise impulses of the same polarity; signal translating means for applying said composite video signal to utilization means; automatic gain control circuit means including a timed gated transistor having input and output electrodes, with said input electrode coupled to said signal translating means to supply said composite video signal thereto; time constant circuit means connected to the output electrode of said gated transistor means to provide an automatic gain control signal in proportion to the amplitude of the synchronizing signal component of said composite video signal; a noise cancelling transistor having input, output and common electrodes; means including a potential supply connected to said common electrode for biasing said noise cancelling transistor into saturated conduction; resistance means coupling to output electrode of said noise cancelling transistor to the input electrode of said time gated transistor; and circuit means coupling the input electrode of said noise cancelling transistor to said signal translating means to supply said composite video signal thereto, with noise impulses of said given polarity exceeding the maximum level of the synchronizing signal component of said composite video signal by a predetermined amount causing said noise cancelling transistor to become non-conductive, whereby noise cancelling impulses are coupled to the input electrode of said time gated transistor to prevent noise charge-up of the time constant circuit connected to the output electrode thereof.

3. In a receiver for television signals including video signal components and synchronizing signal components of an amplitude exceeding the peak amplitude of the video signal components, which signal may include noise bursts of an amplitude exceeding the peak amplitude of the synchronizing signal components, the combination including: means including a video detector for demodulating the television signals and providing a composite video signal, which composite video signal includes synchronization pulses of a given polarity and which pulses may include noise impulses of the same polarity; signal translating means for applying said composite video signal to utilization means; synchronizing signal separator circuit means including a first transistor having input and output electrodes; time constant network means including series capacitance means coupling said input electrode of said first transistor to said signal translating means to supply said composite video signal thereto, with said time constant network means biasing said first transistor to permit conduction thereof by synchronizing pulses, and with said time constant network means retaining a charge to reverse bias said first transistor non-conducting during application of the video signal portion of said composite video signal thereto; automatic gain control circuit means including a second transistor having input and output electrodes; resistance-capacitance circuit means connected to the output electrode of said second transistor means; circuit means for gating said second transistor to charge said resistance-capacitance circuit means by synchronizing pulses; a third transistor having input, output and common electrodes; means including a potential supply connected to said common electrode for biasing said third transistor into saturated conduction; first resistance means connecting the output electrode of said third transistor to the series capacitance coupled to the input electrode of said first transistor; second resistance means connecting the output electrode of said third transistor to the input electrode of said second transistor; and circuit means coupling the input electrode of said third transistor to said signal translating means to supply said composite video signal thereto, with noise impulses of said given polarity exceeding the maximum level of said synchronizing pulses by a predetermined amount causing said third transistor to become non-conducting, whereby noise cancelling impulses are coupled to the input electrode of said second transistor and to the series capacitance means of said time constant network means with a reverse polarity to cancel impulse noise therefrom.

4. In a receiver for television signals the combination including: means including a video detector for demodulating the television signal and providing a composite video signal, which composite video signal includes a synchronizing signal component of a given polarity and of an amplitude exceeding the maximum amplitude of the information signal component thereof, and which video signal may include impulse noise of the same polarity as said synchronizing signal component; signal translating means for applying said composite video signal to utilization means, said signal translating means including at least one transistor video amplifier and means for applying an operating voltage from a D.C. supply of a polarity opposite to said given polarity to at least one electrode thereof; an NPN synchronizing signal separator transistor having emitter, base and collector electrodes; time constant network means including series capacitance means coupling the base electrode of said synchronizing separator transistor to said signal translating means, with said time constant network means providing self-bias for said synchronizing signal separator transistor to permit conduction thereof by synchronizing signals and to retain a charge to reverse bias said synchronizing signal separator transistor to cutoff during intervals between said synchronizing signals; automatic gain control circuit means including a time gated NPN transistor with emitter, collector and base electrodes; resistance capacitance circuit means connected to the emitter electrode of said time gated transistor to provide an automatic gain control signal in proportion to the amplitude of said synchronizing signals; an NPN noise cancelling transistor having emitter, collector and base electrodes; resistance means direct current coupling the base electrode of said noise cancelling transistor to said D.C. supply; means applying a bias potential of opposite polarity from said D.C. supply to the emitter electrode of said noise inverting transistor to retain the same in saturated conduction; first resistance means direct current coupling the collector electrode of said noise cancelling transistor to the base electrode of said time gated transistor; second resistance means direct current coupling the collector electrode of said noise cancelling transistor to the series capacitance of said time constant network means; and direct current conducting means coupling the base electrode of said noise cancelling transistor to said video amplifier transistor, with the noise impulses exceeding maximum level of said synchronizing signal component by a predetermined amount causing said noise cancelling transistor to become non-conductive, thereby coupling impulses of opposite polarity with respect to said noise impulses to the base electrode of said time gated transistor and to the series capacitance of said time constant network means to cancel impulse noise therefrom.

5. In a receiver for television signals the combination including: means including a video detector for demodulating the television signal and providing a composite video signal, which composite video signal includes a synchronizing signal component of a given polarity and of an amplitude exceeding the maximum amplitude of the video information signal component thereof, and which video signal may include impulse noise of the same polarity as said synchronizing signal component; signal translating means for applying said composite video signal to utilization means, said signal translating means including at least one transistor video amplifier and means for applying an operating voltage from a D.C. supply to at least one electrode thereof; synchronizing signal responsive circuit means including a first transistor having emitter, collector, and base electrodes; signal conducting means including a source of D.C. potential and coupling said signal translating means to the base electrode of said first transistor so the impulse noise is applied thereto with given polarity, a noise canceling transistor having emitter, collector and base electrodes; resistance means direct current coupling the base electrode of said noise canceling transistor to said D.C. supply; means applying a biasing voltage of opposite polarity from that of said D.C. supply to the emitter electrode of said noise canceling transistor to bias the same into saturated conduction; resistance means direct current connecting the collector electrode of said noise canceling transistor to the signal conducting means; and circuit means coupling the base electrode of said noise canceling transistor to said video amplifier transistor, with the noise impulses exceeding the maximum level of the synchronizing signal component of the composite video signal by a predetermined amount causing said noise canceling transistor to become nonconductive so that impulse noise appears at the collector of said noise canceling transistor with a polarity opposite to said given polarity, whereby the impulse noise is reduced at said first transistor.

6. In a receiver for television signals the combination including: means including a video detector for demodulating the television signal and providing a composite video signal, which composite video signal includes a synchronizing signal component of a given polarity and of an amplitude exceeding the amplitude of the video information signal components thereof, and which video signal may include impulse noise of the same polarity as said synchronizing signal component; signal translating means conducting said composite video signal; synchronizing signal responsive circuit means including a first transistor; signal conducting means coupled from said signal translating means to said first transistor and including a source of direct current potential, said signal conducting means applying the video signal to said first transistor with given polarity; a noise separating and canceling circuit including a second transistor having input, output and common electrodes; resistor means connected between said output electrode and said signal conducting means and providing a direct current path to said source of potential; a biasing circuit connected to said input and common electrodes including a direct current potential supply for causing saturation of said second transistor; and circuit means coupling said input electrode to said signal translating means so that the impulse noise causes decreased conduction of said second transistor for reducing the effect of the impulse noise at said first transistor.

7. In a receiver for television signals the combination including: means including a video detector for demodulating the television signal and providing a composite video signal, which composite video signal includes a synchronizing signal component of a given polarity and of an amplitude exceeding the amplitude of the video information signal components thereof, and which video signal may include impulse noise of the same polarity as said synchronizing signal component; signal translating means conducting said composite video signal; synchronizing signal responsive circuit means including a first transistor; signal conducting means coupled from said signal translating means to said first transistor and including a first resistor and a source of direct current potential, said signal conducting means applying the video signal through said first resistor to said first transistor with given polarity; a noise separating and canceling circuit including a second transistor having input, output and common electrodes, a second resistor connected between said output electrode and said first resistor and providing a direct current path to said source of potential; a biasing circuit connected to said input and common electrodes including a variable bias setting resistor and a direct current potential supply for causing saturation of said second transistor; and circuit means direct current coupling said input electrode to said signal translating means so that the impulse noise causes decreased conduction of said second transistor for reducing the effect of the impulse noise at said first transistor.

References Cited by the Examiner

UNITED STATES PATENTS

| | | | |
|---|---|---|---|
| 2,797,259 | 6/57 | Thomas | 178—7.3 |
| 2,989,589 | 6/61 | Thomas et al. | 178—7.3 |

DAVID G. REDINBAUGH, *Primary Examiner.*